J. Lovatt,
Skate,
No. 3,186. Reissued Nov. 10, 1868
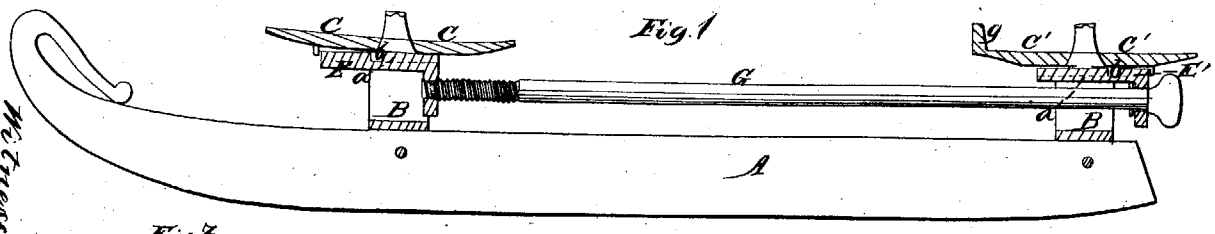
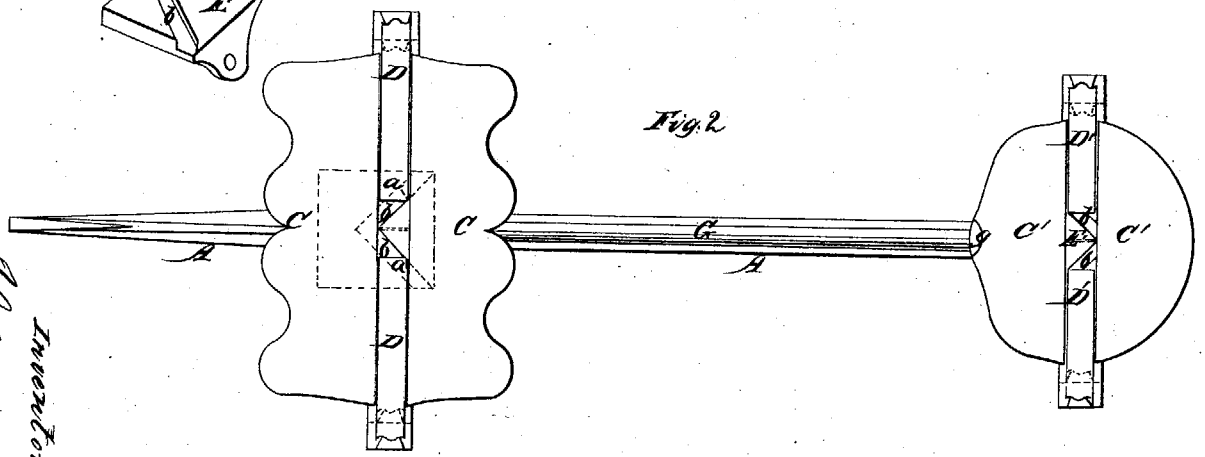
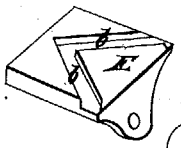
Witnesses
Charles Dawson
Morneling Daily
Inventor.
John Lovatt
N. PETERS, PHOTO-LITHOGRAPHER, WASHINGTON, D. C.

United States Patent Office.

JOHN LOVATT, OF NEWARK, NEW JERSEY.

*Letters Patent No.* 28,495, *dated May* 29, 1860; *reissue No.* 3,186, *dated November* 10, 1868.

IMPROVEMENT IN SKATES.

The Schedule referred to in these Letters Patent and making part of the same.

*To all whom it may concern:*

Be it known that I, JOHN LOVATT, of Newark, in the county of Essex, and State of New Jersey, have invented a new and useful Improvement in Clamping Skates to Boots or Shoes; and I do hereby declare that the following is a full, clear, and exact description thereof, reference being had to the accompanying drawings, forming a part of this specification, in which—

Figure 1 represents a longitudinal vertical section, taken through the heel and sole-plates, showing the screw-rod and movable pieces for adjusting the clamps to the sole of the boot.

Figure 2 is a top view of the skate, showing the four clamps and the movable slotted blocks in two positions.

Figure 3 is a perspective view of one of the slotted blocks detached from the foot-stand of the skate.

Similar letters of reference indicate corresponding parts in the three figures.

To enable those skilled in the art to fully understand my invention, I will proceed to describe its construction and operation.

In the drawings, A represents the runner or skate-iron, of any suitable shape, to which are secured, by rivets or screws, two standards, B B, which support the heel and sole-plates C C, and to which the heel and sole-plates are secured. These plates are of a sufficient length and width to give a firm and steady bearing for the feet.

D D D′ D′ are the clamp-bars, which have their edges bevelled down, so that they will fit in suitable slots made to receive them in the plates C C′. Their ends are turned up, and slightly over, and made sharp, so that they will serve as jaws, which will sink into the edges of the leather sole and heel, and gripe it firmly. The inner ends of these clamping-jaws have pins, *a a*, shown in dotted lines, fig. 1, projecting down into slots *b*, in blocks E E, fig. 3.

These blocks are placed under the sole and heel-plates C C, and in the middle of the same, and are suitably held to these plates between guides, which only allow them to have a longitudinal movement. The grooves *b* are cut into the faces of blocks E E′ in a wedge or V-shape, the angles of which are contrary to each other in arrangement in their bearings, so that a rod, G, having a screw-thread cut on its front end, and tapped through a projecting lip of the block E, and passing loosely through a similar projecting lip on block E′, can be made, by screwing it up so as to move the blocks toward each other, to contract the jaws.

The screw-rod G extends longitudinally over the skate-iron, works loosely in the lip of the heel block E′, and is tapped with a screw-thread through the lip of block E, as above described. It has a thumb-piece on its rear end, which is entirely out of the way in skating, but is very conveniently operated to tighten or loosen the clamps.

It will be seen by this description that the power obtained by the V-shaped slots, acting on the clamping-jaws, is very great, being a combination of screw and wedge, and the clamps are drawn laterally, to gripe firmly and securely the sole and heel of a boot or shoe by the operation of the screw G, rendering no other fastening necessary.

The lug or shoulder *q*, projecting up from the front of the plate, is to prevent the boot from slipping forward, and may be placed either upon the heel-plate, as shown, or upon the front of the sole-plate, when the plate is made the full length.

The pin *h*, on rod G, is turned backwards to loosen the skate from the boot.

What I claim as my invention, and desire to secure by Letters Patent, is—

1. The adjustable hooked clamps D D′, or their equivalents, for fastening skates, arranged to be tightened and adjusted by means of an adjusting-screw.

2. Constructing a skate, having a supporting-plate, with a projecting piece or lug, to prevent the boot from slipping forward, and clamp-fastenings, adjusted by means of an adjusting-screw.

3. The combination of the movable slotted blocks E E′, or their equivalents, with clamps D D′, and the adjustable screw G, arranged substantially as described, and for the purposes specified.

JOHN LOVATT.

Witnesses:

CHARLES DAWSON,
CORNELIUS DAILY.